United States Patent
Unno et al.

(10) Patent No.: US 10,439,544 B2
(45) Date of Patent: Oct. 8, 2019

(54) DRIVE SYSTEM, TRANSPORTER, AND CONTROL METHOD PERFORMED BY DRIVE SYSTEM

(71) Applicant: HONDA MOTOR CO., LTD., Tokyo (JP)

(72) Inventors: Ryota Unno, Wako (JP); Masahiro Shimada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 549 days.

(21) Appl. No.: 15/285,488

(22) Filed: Oct. 5, 2016

(65) Prior Publication Data
US 2017/0104436 A1 Apr. 13, 2017

(30) Foreign Application Priority Data
Oct. 8, 2015 (JP) .................. 2015-200352

(51) Int. Cl.
*H02P 1/00* (2006.01)
*H02P 29/024* (2016.01)
*H02P 27/06* (2006.01)
*B60L 50/51* (2019.01)

(52) U.S. Cl.
CPC ............ *H02P 29/024* (2013.01); *B60L 50/51* (2019.02); *H02P 27/06* (2013.01); *H02P 29/0241* (2016.02); *H02P 2201/09* (2013.01)

(58) Field of Classification Search
CPC ............ Y02T 10/7005; Y02T 10/7044; B60L 11/1861; B60L 3/0046; B60L 11/1816
See application file for complete search history.

(56) References Cited

U.S. PATENT DOCUMENTS

2014/0111120 A1* 4/2014 Mitsutani ............... B60L 15/00
318/139

FOREIGN PATENT DOCUMENTS

| JP | 2011-041386 | | 2/2011 |
| JP | 2011041386 A | * | 2/2011 |
| JP | 2014-155297 | | 8/2014 |
| JP | 2014-241662 | | 12/2014 |

OTHER PUBLICATIONS

Japanese Office Action for corresponding JP Application No. 2015-200352, dated Aug. 8, 2017 (w/ English machine translation).

* cited by examiner

*Primary Examiner* — Bickey Dhakal
*Assistant Examiner* — Zoheb Imtiaz
(74) *Attorney, Agent, or Firm* — Mori & Ward, LLP

(57) ABSTRACT

A drive system includes a first energy storage, a second energy storage, a voltage transformer, a drive apparatus, a detector, and circuitry. The first energy storage outputs a first voltage. The second energy storage outputs a second voltage different from the first voltage. The voltage transformer transforms at least one of the first voltage and the second voltage. The drive apparatus is driven with power supplied from at least one of the first energy storage and the second energy storage. The detector detects a fault in at least one of the first energy storage and the second energy storage. The circuitry is configured to control the voltage transformer in a first control mode or in a second control mode.

20 Claims, 9 Drawing Sheets

DRIVE SYSTEM, TRANSPORTER, AND CONTROL METHOD PERFORMED BY DRIVE SYSTEM

CROSS-REFERENCE TO RELATED APPLICATIONS

The present application claims priority under 35 U.S.C. § 119 to Japanese Patent Application No. 2015-200352, filed Oct. 8, 2015, entitled "Drive system, Transporter, and Control Method Performed by Drive System." The contents of this application are incorporated herein by reference in their entirety.

BACKGROUND

1. Field

The present disclosure relates to a drive system, a transporter, and a control method performed by the drive system.

2. Description of the Related Art

Japanese Unexamined Patent Application Publication No. 2011-41386 describes a vehicle provided with three energy storage units, a drive system configured so as to generate drive force using power supplied from the three energy storage units, and three relays provided corresponding to the three energy storage units to switch between supplying and disconnecting power from the three energy storage units. An ECU of the vehicle detects faults in the three energy storage units, and controls the three relays so as to change connection states between the drive system and the three energy storage units according to detected fault states in the energy storage units.

SUMMARY

According to a first aspect of the present invention, a drive system includes a first energy storage, a second energy storage, a voltage transformation section, a drive section, a detection section, and a controller. The second energy storage has a different voltage to the first energy storage. The voltage transformation section transforms at least one of an output voltage of the first energy storage and an output voltage of the second energy storage. The drive section is driven by power supplied from at least one of the first energy storage and the second energy storage. The detection section detects faults in the first energy storage and the second energy storage. The controller controls the voltage transformation section based on either a first control mode in which control is performed such that, according to a difference between a target power and a power supplied to the drive section from one of the first energy storage and the second energy storage, the voltage transformation section transforms an output voltage of the other of the first energy storage and the second energy storage, or a second control mode in which control is performed such that, according to an output voltage of one of the first energy storage and the second energy storage and to a target voltage to be applied to the drive section, the voltage transformation section transforms the output voltage of the one of the first energy storage and the second energy storage. When the detection section has not detected a fault in the first energy storage and has not detected a fault in the second energy storage, the controller sets a power suppliable to the drive section to the sum of powers outputtable by the first energy storage and the second energy storage and controls the voltage transformation section in the first control mode. When the detection section has detected a fault in either the first energy storage or the second energy storage, the controller sets the suppliable power to the drive section to the outputtable power of the non-faulty energy storage and then switches from the first control mode to the second control mode, and controls the voltage transformation section in the second control mode to transform the output voltage of the non-faulty energy storage.

According to a second aspect of the present invention, a control method performed by a drive system which includes a first energy storage, a second energy storage, a voltage transformation section, a drive section, a detection section, and a controller. The second energy storage has a different voltage to the first energy storage. The voltage transformation section transforms at least one of an output voltage of the first energy storage and an output voltage of the second energy storage. The drive section is driven by power supplied from at least one of the first energy storage and the second energy storage. The detection section detects faults in the first energy storage and the second energy storage. The controller controls the voltage transformation section based on either a first control mode in which control is performed such that, according to a difference between a target power and a power supplied to the drive section from one of the first energy storage and the second energy storage, the voltage transformation section transforms an output voltage of the other of the first energy storage and the second energy storage, or a second control mode in which control is performed such that, according to an output voltage of one of the first energy storage and the second energy storage and to a target voltage to be applied to the drive section, the voltage transformation section transforms the output voltage of the one of the first energy storage and the second energy storage. The control method includes, when the detection section has not detected a fault in the first energy storage and has not detected a fault in the second energy storage, setting a power suppliable to the drive section to the sum of powers outputtable by the first energy storage and the second energy storage and controlling the voltage transformation section in the first control mode. When the detection section has detected a fault in either the first energy storage or the second energy storage, setting the suppliable power to the drive section to the outputtable power of the non-faulty energy storage and then switching from the first control mode to the second control mode, and controlling the voltage transformation section in the second control mode to transform the output voltage of the non-faulty energy storage.

According to a third aspect of the present invention, a drive system includes a first energy storage, a second energy storage, a voltage transformer, a drive apparatus, a detector, and circuitry. The first energy storage outputs a first voltage. The second energy storage outputs a second voltage different from the first voltage. The voltage transformer transforms at least one of the first voltage and the second voltage. The drive apparatus is driven with power supplied from at least one of the first energy storage and the second energy storage. The detector detects a fault in at least one of the first energy storage and the second energy storage. The circuitry is configured to control the voltage transformer in a first control mode and determine a power suppliable to the drive apparatus to be a sum of a first power suppliable by the first energy storage and a second power suppliable by the second energy storage in a case where the detector does not detect the fault in the first energy storage and the fault in the second energy storage, the voltage transformer being controlled, in the first control mode, to transform a voltage output by one of the first energy storage and the second energy storage according to a difference between a target power and a power supplied to the drive apparatus from another of the first energy storage and the second energy storage. The circuitry is configured to control the voltage transformer in a second control mode to transform an output voltage supplied by a non-faulty energy storage among the first energy storage and the second energy storage after determining the power suppliable to the drive apparatus to be a power suppliable by the non-faulty energy storage in a case where the detector detects the fault in either the first energy storage or the second energy storage, the voltage transformer being controlled, in the second control mode, to transform one of the first voltage and the second voltage according to a target voltage to be applied to the drive apparatus and the one of the first voltage and the second voltage.

According to a fourth aspect of the present invention, a control method performed by a drive system, includes controlling a voltage transformer in a first control mode and determining a power suppliable to a drive apparatus to be a sum of a first power suppliable by a first energy storage and a second power suppliable by a second energy storage in a case where a detector does not detect a fault in the first energy storage and a fault in the second energy storage, the voltage transformer being controlled, in the first control mode, to transform a voltage output by one of the first energy storage and the second energy storage according to a difference between a target power and a power supplied to the drive apparatus from another of the first energy storage and the second energy storage. The control method includes controlling the voltage transformer in a second control mode to transform an output voltage supplied by a non-faulty energy storage among the first energy storage and the second energy storage after determining the power suppliable to the drive apparatus to be a power suppliable by the non-faulty energy storage in a case where the detector detects the fault in either the first energy storage or the second energy storage, the voltage transformer being controlled, in the second control mode, to transform one of the first voltage and the second voltage according to a target voltage to be applied to the drive apparatus and the one of the first voltage and the second voltage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
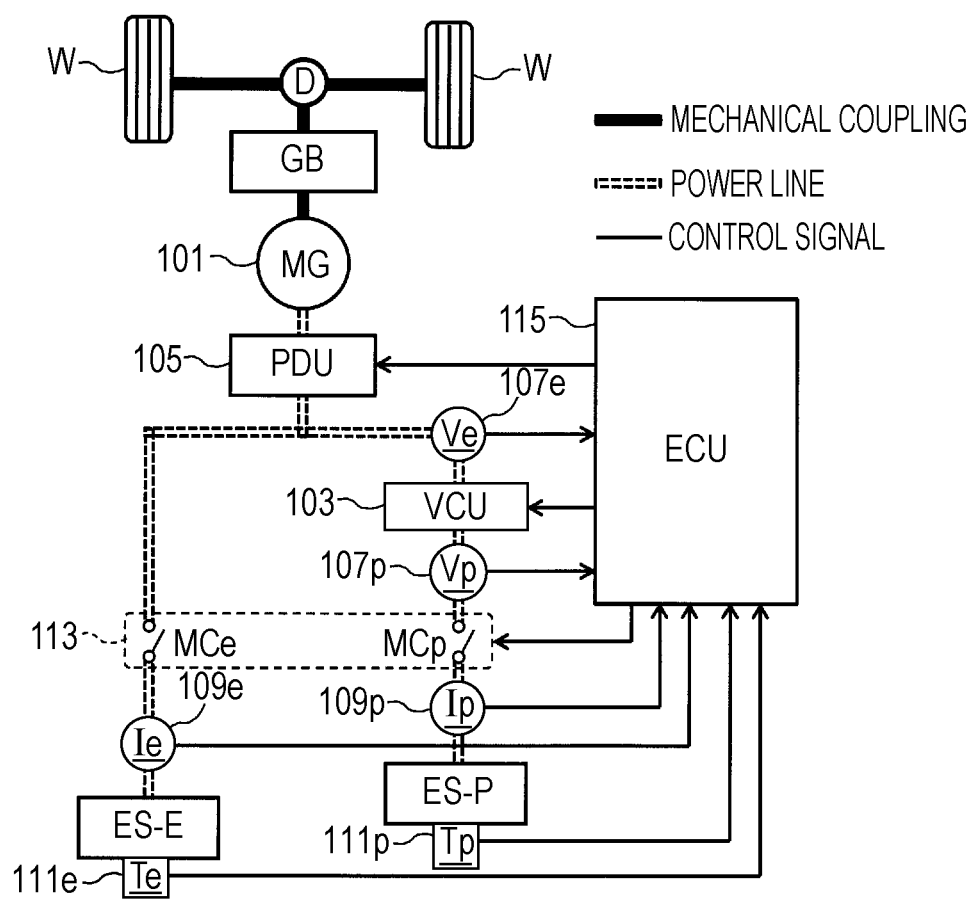
FIG. 1 is a block diagram of an internal configuration of an electrically powered vehicle of a first embodiment.

The embodiments will now be described with reference to the accompanying drawings, wherein like reference numerals designate corresponding or identical elements throughout the various drawings.

Explanation follows regarding an embodiment of the present disclosure, with reference to the drawings.

First Embodiment

FIG. 1 is a block diagram illustrating an internal configuration of an electrically powered vehicle of a first embodiment. The single motor electrically powered vehicle illustrated in FIG. 1 includes a motor/generator (MG) 101, a high-capacity battery ES-E, a high-power battery ES-P, a voltage control unit (VCU) 103, a power drive unit (PDU) 105, voltage sensors 107$p$ and 107$e$, current sensors 109$p$ and 109$e$, temperature sensors 111$p$ and 111$e$, a switch section 113, and an electronic control unit (ECU) 115. Note that in FIG. 1, mechanical couplings are indicated by bold continuous lines, power lines are indicated by double dashed lines, and control signals are indicated by thin continuous lines.

The motor/generator 101 is driven by power obtained from at least one out of the high-capacity battery ES-E or the high-power battery ES-P, and generates motive power to drive the electrically powered vehicle. The torque generated by the motor/generator 101 is transmitted to drive wheels W through a gear box GB including a variable transmission or a fixed transmission, and through a differential gear D. The motor/generator 101 operates as a power generator during deceleration of the electrically powered vehicle, so as to output the braking power of the electrically powered vehicle. Regenerated power generated by the motor/generator 101 operating as a power generator is accumulated in at least one out of the high-capacity battery ES-E or the high-power battery ES-P.

The high-capacity battery ES-E includes plural energy storage cells, such as lithium ion batteries or nickel hydride batteries, and supplies high voltage power to the motor/generator 101. The high-power battery ES-P also includes plural energy storage cells, such as lithium ion batteries or nickel hydride batteries, and supplies high voltage power to the motor/generator 101 through the VCU 103. The high-power battery ES-P is connected through the VCU 103 to the PDU 105, in parallel with the high-capacity battery ES-E. Generally, the voltage of the high-power battery ES-P is lower than the voltage of the high-capacity battery ES-E. Thus, the power of the high-power battery ES-P is stepped up by the VCU 103 to a voltage of the same level as that of the high-capacity battery ES-E, and then supplied to the motor/generator 101 through the PDU 105.

The high-capacity battery ES-E and the high-power battery ES-P are not limited to secondary batteries, such as the nickel hydride batteries or the lithium ion batteries mentioned above, or to fuel cells or metal-air electrochemical cells requiring a supply of an active substance from outside the battery. For example, even though it has a small amount of stored energy, a condenser or capacitor capable of charging or discharging a large quantity of power over a short period of time may be employed as the high-power battery ES-P.

The properties of the high-capacity battery ES-E and the properties of the high-power battery ES-P are different from each other. The high-capacity battery ES-E has a lower power weight density, but a higher energy weight density, than the high-power battery ES-P. The high-power battery ES-P has a lower energy weight density, but a higher power weight density, than the high-capacity battery ES-E. Accordingly, the high-capacity battery ES-E is relatively superior in energy weight density, and the high-power battery ES-P is relatively superior in power weight density. The energy weight density is the quantity of power per unit weight (Wh/kg), and the power weight density is the power output per unit weight (W/kg). Accordingly, the high-capacity battery ES-E that has superior energy weight density is a power storage unit employed for its high capacity, and the high-power battery ES-P that has superior power weight density is a power storage unit employed for its high output.

Such differences between the properties of the high-capacity battery ES-E and the high-power battery ES-P are caused, for example, by various parameters determined by the structure, materials, etc. of elements configuring the battery, such as the electrodes, active substances, electrolytes, and solutions. For example, the energy storage capacity, this being a parameter indicating the total amount of chargeable and dischargeable electricity, of the high-capacity battery ES-E is superior to that of the high-power battery ES-P. However, a C rate property, this being a parameter indicating the ability to withstand deterioration of the energy storage capacity with respect to charging and discharging, and the internal resistance (impedance), this being a parameter indicating the electrical resistance to charging and discharging, are better in the high-power battery ES-P than in the high-capacity battery ES-E.

Figure 2:
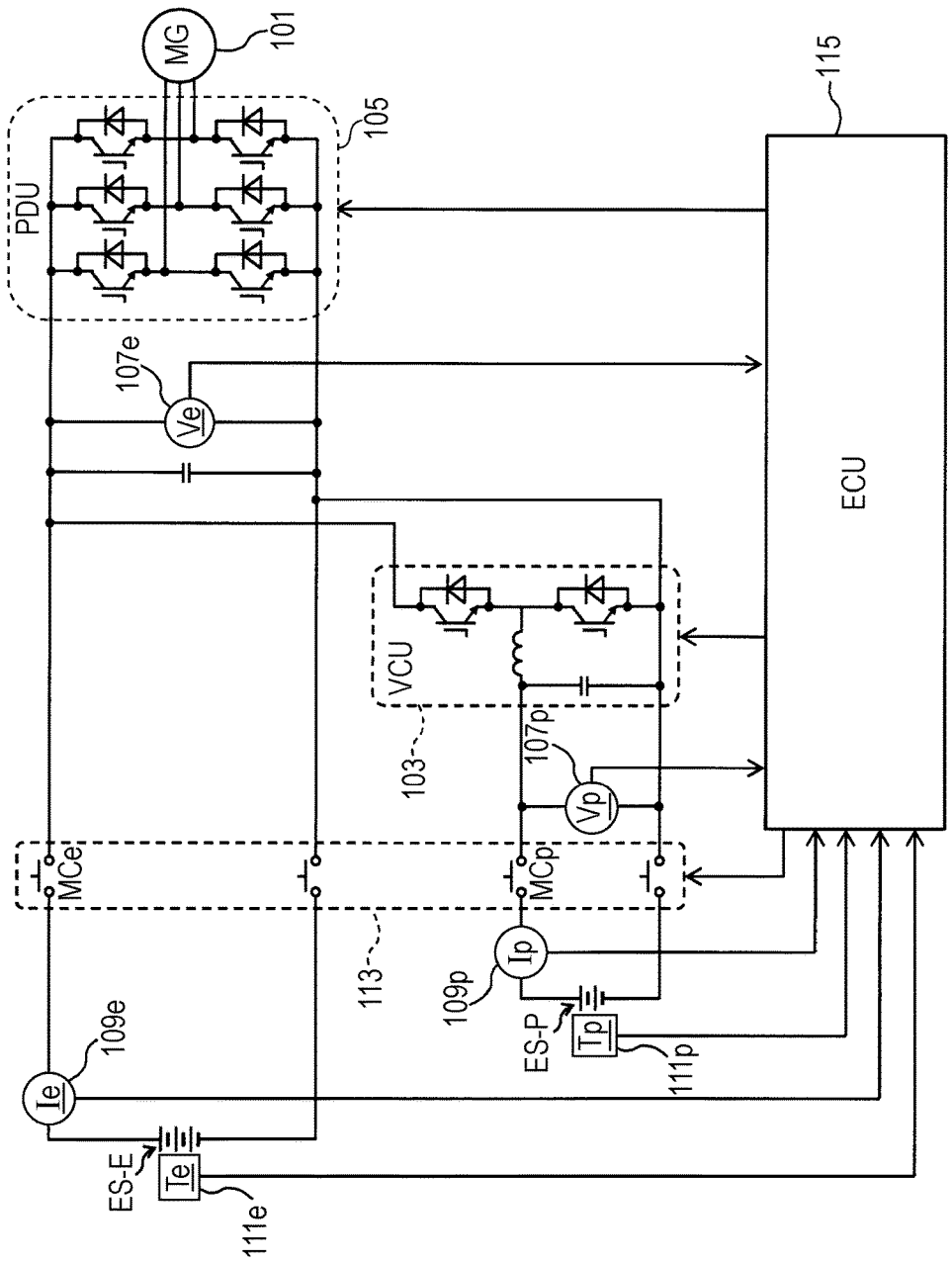
FIG. 2 is an electrical circuit including a high-capacity battery, a high-power battery, a VCU, a PDU, and a motor/generator in the first embodiment.

The VCU 103 steps up the output voltage of the high-power battery ES-P without converting from direct current. The VCU 103 steps down power that has been generated by the motor/generator 101 during deceleration of the electrically powered vehicle and that has been converted into direct current. The VCU 103 also steps down the output voltage of the high-capacity battery ES-E without converting from direct current. Power that has been stepped down by the VCU 103 is used to charge the high-power battery ES-P. FIG. 2 is an electrical circuit including the high-capacity battery ES-E, the high-power battery ES-P, the VCU 103, the PDU 105, and the motor/generator 101 of the first embodiment. As illustrated in FIG. 2, the VCU 103 employs an output voltage of the high-power battery ES-P as an input voltage, and steps up and outputs the voltage of the high-power battery ES-P by switching two switching elements ON and OFF.

The PDU 105 converts direct current voltage into alternating current voltage, and supplies three-phase current to the motor/generator 101. The PDU 105 converts an alternating current voltage input during a regeneration operation of the motor/generator 101 into direct current voltage.

The voltage sensor 107$p$ detects the voltage Vp of the high-power battery ES-P. A signal indicating the voltage Vp detected by the voltage sensor 107$p$ is sent to the ECU 115. The voltage sensor 107$e$ detects the voltage Ve of the high-capacity battery ES-E. The voltage Ve detected by the voltage sensor 107$e$ is equal to the value of the voltage Vp of the high-power battery ES-P after being stepped up by the VCU 103. A signal indicating the voltage Ve detected by the voltage sensor 107$e$ is sent to the ECU 115.

The current sensor 109$p$ detects an input/output current Ip of the high-power battery ES-P. A signal indicating the input/output current Ip detected by the current sensor 109$p$ is sent to the ECU 115. The current sensor 109$e$ detects an input/output current Ie of the high-capacity battery ES-E. The signal indicating the input/output current Ie detected by the current sensor 109$e$ is sent to the ECU 115.

The temperature sensor 111$p$ detects the temperature Tp of the high-power battery ES-P. A signal indicating the temperature Tp detected by the temperature sensor 111$p$ is sent to the ECU 115. The temperature sensor 111$e$ detects a temperature Te of the high-capacity battery ES-E. A signal indicating the temperature Te detected by the temperature sensor 111$e$ is sent to the ECU 115.

The switch section 113 includes a contactor MCe that connects and disconnects a current path from the high-capacity battery ES-E to either the PDU 105 or the VCU 103, and a contactor MCp that connects and disconnects a current path from the high-power battery ES-P to the VCU 103. The respective contactors Mce, MCp are opened and closed under the control of the ECU 115.

The ECU 115 controls the PDU 105 and the VCU 103, and also controls opening and closing of the switch section 113. The ECU 115 also manages an upper limit value (referred to below as the "system permitted power") of the suppliable power to a drive section configured by the PDU 105 and the motor/generator 101. Normally, the total of the outputtable power of the high-capacity battery ES-E and the outputtable power of the high-power battery ES-P is set as the system permitted power.

In order to suppress promotion of deterioration and faults due to drawing excessive power, the outputtable powers of the high-capacity battery ES-E and the high-power battery ES-P are set to values smaller than the maximum power the respective batteries are capable of outputting.

The ECU 115 employs the VCU 103 to perform power distribution control in order to exploit the respective properties of the high-capacity battery ES-E and the high-power battery ES-P that have different properties to each other. When this power distribution control is performed, the high-capacity battery ES-E is employed to supply power to the motor/generator 101 at a constant level when driving the electrically powered vehicle, and the high-power battery ES-P is employed to supply power to the motor/generator 101 when a large drive power is required to drive the electrically powered vehicle.

The ECU 115 detects faults, and prior indicators of faults, in the high-capacity battery ES-E based on the voltage detected by the voltage sensor 107$e$, the current detected by the current sensor 109$e$, and the temperature detected by the temperature sensor 111$e$. For example, faults in the high-capacity battery ES-E are detected when broken lines or the like occur and the current becomes extremely small. A prior indicator of a fault in the high-capacity battery ES-E is detected when the temperature of the high-capacity battery ES-E becomes extremely high.

Moreover, the ECU 115 controls the VCU 103 in a "current control mode" when a fault has not occurred in the high-capacity battery ES-E, and controls the VCU 103 in a "voltage control mode" when a fault has occurred in the high-capacity battery ES-E. Explanation follows regarding the two control modes (the current control mode and the voltage control mode) with which the ECU 115 controls the VCU 103.

The current control mode is, in principle, employed in a state in which both the high-capacity battery ES-E and the high-power battery ES-P are functioning correctly. In the current control mode, the voltage of the high-capacity battery ES-E is applied to the motor/generator 101 by the power distribution control of the VCU 103 described above, and in cases in which the power supplied from the high-capacity battery ES-E does not meet a demand for power corresponding to the drive power demanded by the motor/generator 101, the high-power battery ES-P outputs power to make up the insufficiency amount. However, since the voltage Vp of the high-power battery ES-P is lower than the voltage Ve applied to the motor/generator 101 by the high-capacity battery ES-E, the VCU 103 steps up the voltage Vp of the high-power battery ES-P so as to equal the voltage Ve of the high-capacity battery ES-E. In this manner, in the current control mode, the voltage Vp of the high-power battery ES-P is stepped up so as to match a voltage equal to the voltage Ve of the high-capacity battery ES-E. Moreover, the current Ip output by the high-power battery ES-P differs according to the size of the power insufficiency amount demanded of the high-power battery ES-P. Accordingly, in the current control mode, the voltage Vp and the current Ip of the high-power battery ES-P are fed back to the VCU 103. Note that control is stable when performing control in the current control mode.

The voltage control mode is employed in a state in which the high-power battery ES-P is functioning correctly but a fault has occurred in the high-capacity battery ES-E. In the voltage control mode, power is supplied to the motor/generator 101 from the high-power battery ES-P only, and the VCU 103 steps up the voltage Vp of the high-power battery ES-P such that the voltage applied to the motor/generator 101 reaches an optimum voltage having a maximum drive efficiency for the drive power demanded by the motor/generator 101. Accordingly, in the voltage control mode, either feed-forward control to set an instruction value to the optimum voltage of the motor/generator 101, or feed-back control to set an instruction value to the difference between the voltage Vp of the high-power battery ES-P and the optimum voltage of the motor/generator 101, is employed to control the VCU 103. This thereby enables drive efficiency of the motor/generator 101 to be optimized.

Figure 3:
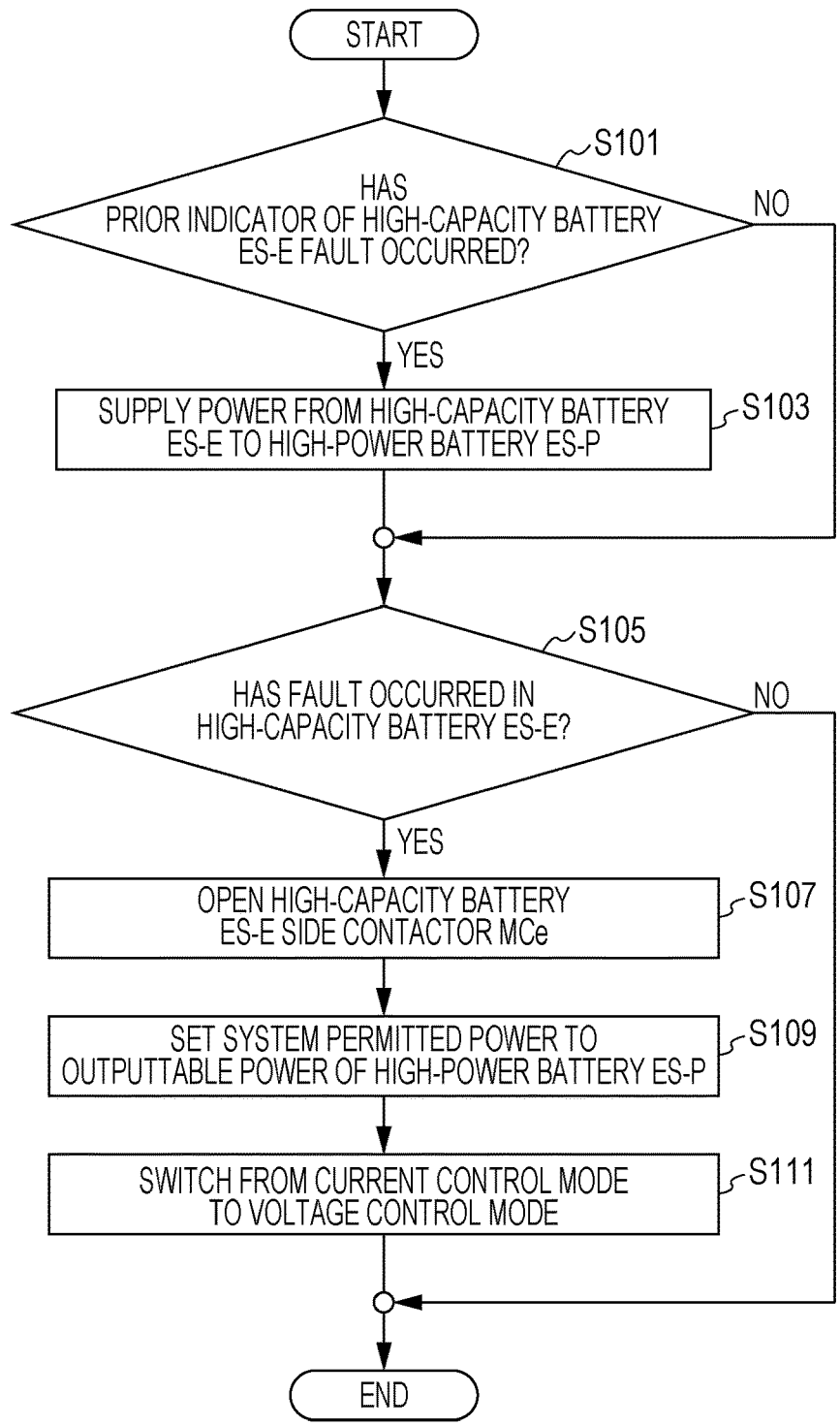
FIG. 3 is a flowchart illustrating a process in which an ECU switches a VCU control mode when a fault has occurred in a high-capacity battery.

Detailed explanation follows with reference to FIG. 3 regarding a method for switching between the control modes of the VCU 103 by the ECU 115 when a fault occurs in the high-capacity battery ES-E while the ECU 115 is controlling the VCU 103 in the current control mode due to both the high-capacity battery ES-E and the high-power battery ES-P functioning correctly. FIG. 3 is a flowchart illustrating a process in which the ECU 115 switches a control mode of the VCU 103 when a fault has occurred in the high-capacity battery ES-E.

Figure 4:
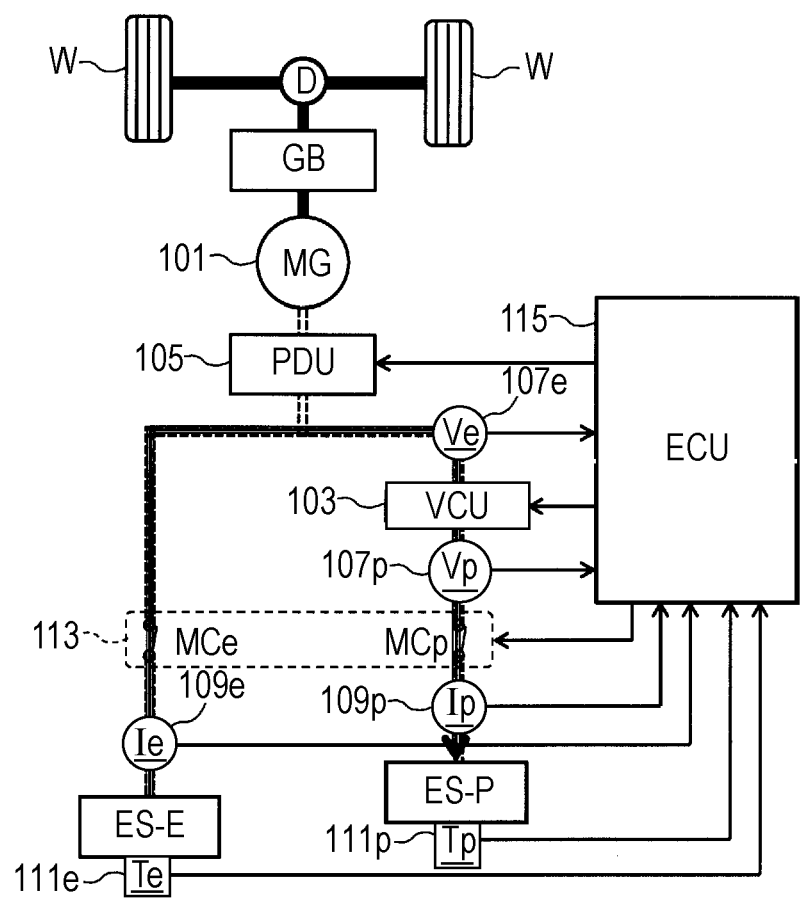
FIG. 4 is a diagram illustrating a flow of current from a high-power battery to a high-capacity battery during power provision.

As illustrated in FIG. 3, the ECU 115 determines whether or not a prior indicator of a fault in the high-capacity battery ES-E has occurred based on the voltage detected by the voltage sensor 107e, the current detected by the current sensor 109e, and the temperature detected by the temperature sensor 111e (step S101). Processing proceeds to step S103 if a prior indicator is present, and processing proceeds to step S105 if a prior indicator is not present. At step S103, the ECU 115 controls the VCU 103 so as to supply power from the high-capacity battery ES-E to the high-power battery ES-P. FIG. 4 is a diagram illustrating a flow of current from the high-power battery ES-P to the high-capacity battery ES-E during such power provision. Next, at step S105, the ECU 115 determines whether or not a fault has occurred in the high-capacity battery ES-E based on the voltage detected by the voltage sensor 107e, the current detected by the current sensor 109e, and the temperature detected by the temperature sensor 111e. Processing proceeds to step S107 when a fault is determined to have occurred, and the processing sequence ends when a fault is determined not to have occurred.

Figure 5:
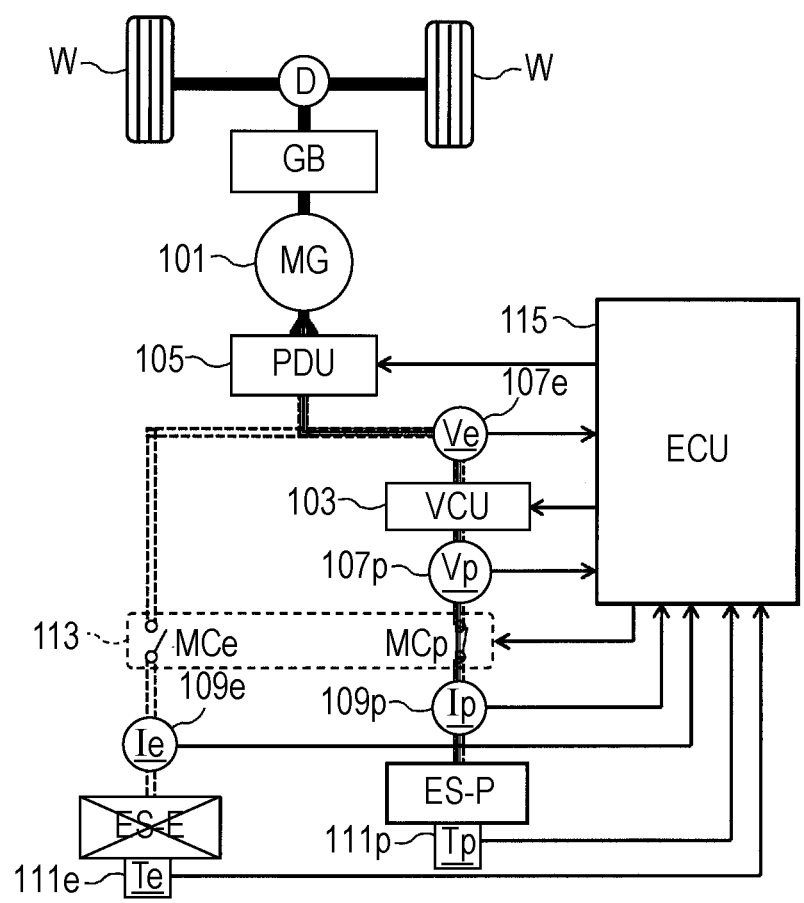
FIG. 5 is a diagram illustrating a flow of current from a high-power battery to a motor/generator when controlling a VCU in a voltage control mode.

At step S107, the ECU 115 opens the high-capacity battery ES-E side contactor MCe of the switch section 113, disconnecting the current path from the high-capacity battery ES-E to the PDU 105 and the high-power battery ES-P. Next, the ECU 115 sets the system permitted power, this being an upper limit value of the suppliable power to the drive section configured by the PDU 105 and the motor/generator 101, to the outputtable power of the correctly functioning high-power battery ES-P (step S109). Note that the setting value of the system permitted power at step S109 is gradually decreased from the total of the outputtable power of the high-capacity battery ES-E and the outputtable power of the high-power battery ES-P, to the outputtable power of the high-power battery ES-P. Next, the ECU 115 switches the VCU 103 control mode from the current control mode to the voltage control mode (step S111). The ECU 115 then controls the VCU 103 in the voltage control mode. FIG. 5 is a diagram illustrating a flow of current from the high-power battery ES-P to the motor/generator 101 when controlling the VCU 103 in the voltage control mode.

Figure 6:
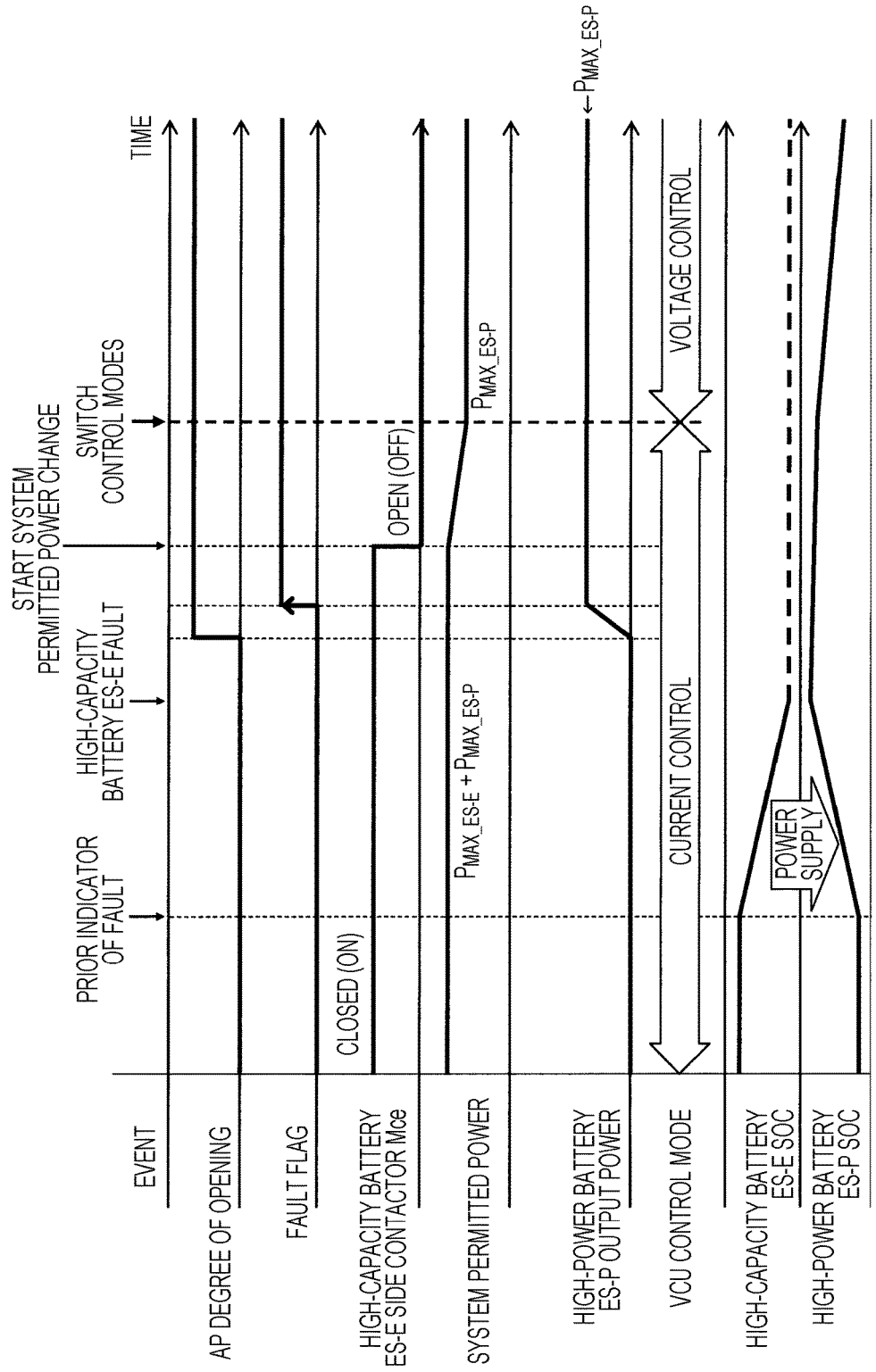
FIG. 6 is a timing chart illustrating changes in various parameters over time during ECU control when a fault has occurred in a high-capacity battery.

According to the processing of the flowchart described above, when a prior indicator of a fault in the high-capacity battery ES-E occurs while the ECU 115 is controlling the VCU 103 in the current control mode due to both the high-capacity battery ES-E and the high-power battery ES-P functioning correctly, the ECU 115 controls the VCU 103 so as to supply power from the high-capacity battery ES-E to the high-power battery ES-P. As a result, as illustrated in FIG. 6, the state of charge (SOC) of the high-capacity battery ES-E decreases, and the SOC of the high-power battery ES-P increases.

Then, if a fault occurs in the high-capacity battery ES-E, the ECU 115 raises a fault flag indicating a fault in the high-capacity battery ES-E. The ECU 115 then opens the high-capacity battery ES-E side contactor MCe, and gradually lowers the setting value of the system permitted power to the outputtable power of the high-power battery ES-P ($P_{MAX\_ES\text{-}P}$). The ECU 115 switches the VCU 103 control mode from the current control mode to the voltage control mode after lowering the setting value of the system permitted power to the outputtable power of the high-power battery ES-P ($P_{MAX\_ES\text{-}P}$). Thereafter, the ECU 115 controls the VCU 103 in the voltage control mode.

Figure 7:
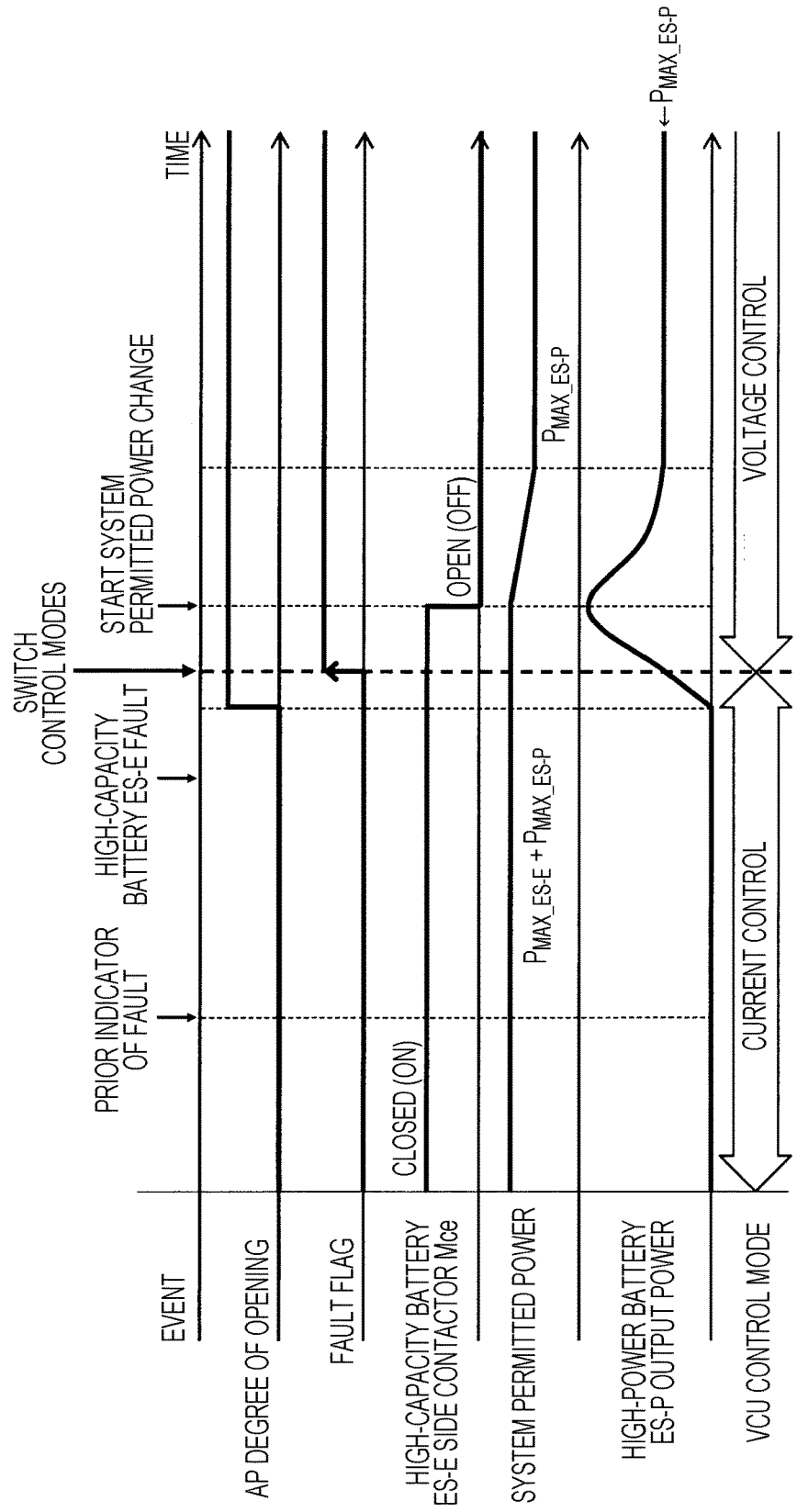
FIG. 7 is a timing chart illustrating changes in various parameters over time during different control to that of FIG. 6 when a fault has occurred in a high-capacity battery.

Supposing that the VCU 103 control mode were to be switched prior to changing the system permitted power, as illustrated in FIG. 7, the VCU 103 would be controlled in the voltage control mode if an AP degree of opening were to be increased by pressing down the accelerator pedal of the electrically powered vehicle in a state in which the high-capacity battery ES-E was faulty. The VCU 103 would therefore step up the voltage of the correctly functioning high-power battery ES-P to the optimum voltage of the motor/generator 101, entailing the possibility of the power output of the high-power battery ES-P overshooting and becoming too large. Such an excessive power discharge is undesirable as it could promote deterioration of the correctly functioning high-power battery ES-P.

However, in the present embodiment, the VCU 103 control mode is not switched until the setting value of the system permitted power has been lowered to the outputtable power of the high-power battery ES-P ($P_{MAX\_ES-P}$). Accordingly, as illustrated in FIG. 6, even were the AP degree of opening to be increased by pressing down the accelerator pedal of the electrically powered vehicle prior to switching the VCU 103 control mode when the high-capacity battery ES-E was faulty, although the system permitted power is set to the total of the outputtable power of the high-capacity battery ES-E and the outputtable power of the high-power battery ES-P ($P_{MAX\_ES-E}+P_{MAX\_ES-P}$), the current amount discharged from the correctly functioning high-power battery ES-P is controlled by the VCU 103 in the current control mode, such that the power output of the correctly functioning high-power battery ES-P is suppressed to an upper limit of the demand for power corresponding to the drive power demanded by the motor/generator 101.

Moreover, since the setting value of the system permitted power has been lowered to the outputtable power of the high-power battery ES-P ($P_{MAX\_ES-P}$) by the time of switching to the voltage control mode, the power output of the high-power battery ES-P is suppressed to an upper limit of the outputtable power of the high-power battery ES-P ($P_{MAX\_ES-P}$) even though the current amount discharged from the correctly functioning high-power battery ES-P is not controlled, and even if the VCU 103 has stepped up the voltage of the high-power battery ES-P to the optimum voltage of the motor/generator 101.

As described above, according to the present embodiment, when a fault has occurred in the high-capacity battery ES-E, the power output of the high-power battery ES-P can be suppressed to an appropriate value without becoming too large, in comparison to cases in which switching to the voltage control mode is performed prior to setting the system permitted power to the outputtable power of the high-power battery ES-P ($P_{MAX\_ES-P}$). This thereby enables the power of the correctly functioning high-power battery ES-P to be employed appropriately. Moreover, although excessive power output would promote battery deterioration, the power output of the high-power battery ES-P can be suppressed to an appropriate value without becoming too large, thereby enabling promotion of deterioration of the high-power battery ES-P to be prevented.

When a fault has occurred in the high-capacity battery ES-E, the high-capacity battery ES-E side contactor MCe is opened prior to switching from the current control mode to the voltage control mode. This thereby enables an inflow of power to the high-capacity battery ES-E or an outflow of power from the high-capacity battery ES-E accompanying the mode change from the current control mode to the voltage control mode to be prevented. Moreover, when a prior indicator of a fault in the high-capacity battery ES-E is present, power is transferred to the high-power battery ES-P, enabling the amount of power that can be utilized if a fault actually occurs to be maximized in advance.

Second Embodiment

Figure 8:
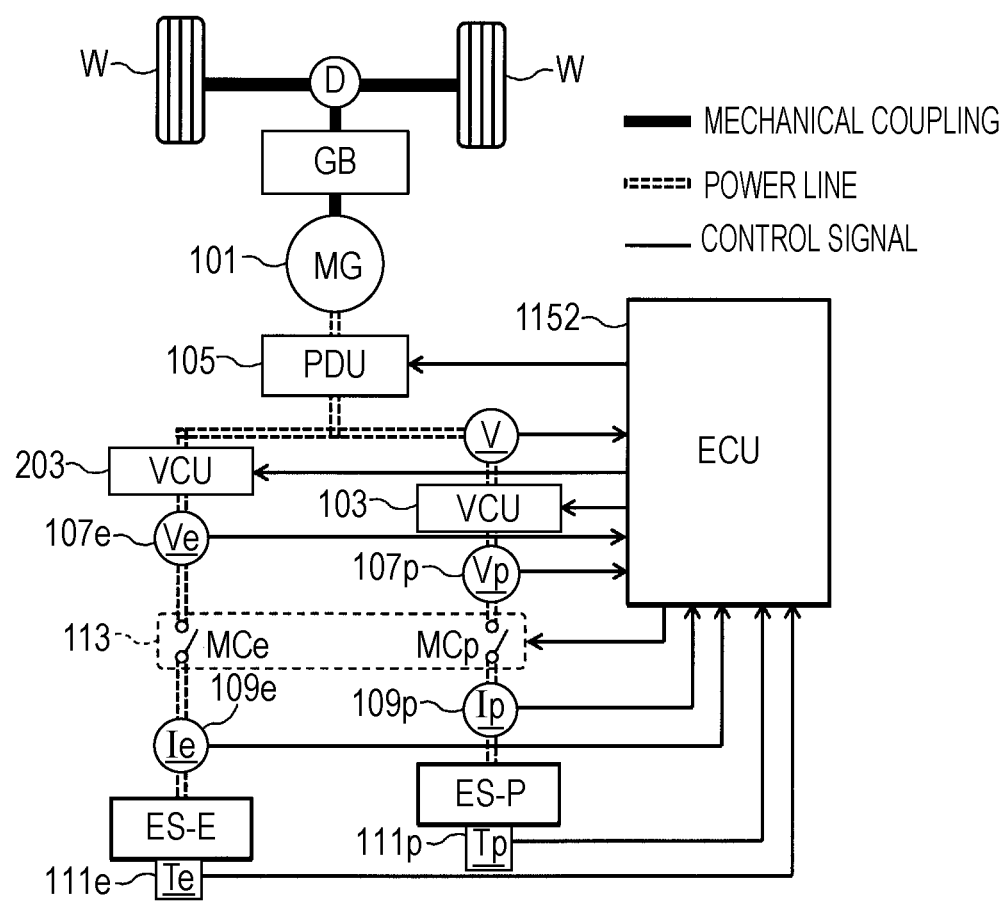
FIG. 8 is a block diagram illustrating an internal configuration of an electrically powered vehicle of a second embodiment.
Figure 9:
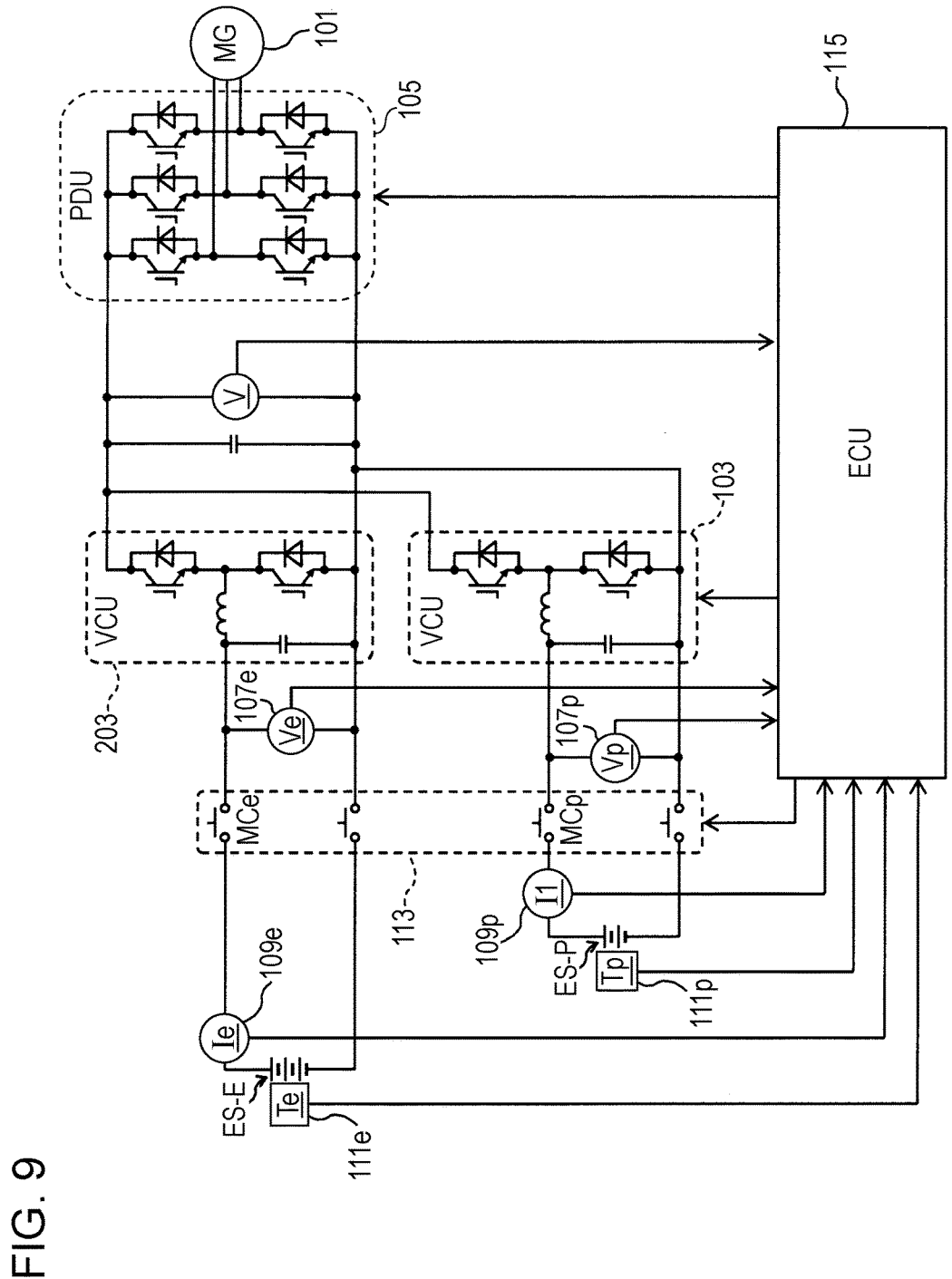
FIG. 9 is an electrical circuit including a high-capacity battery, a high-power battery, a VCU, a PDU, and a motor/generator in the second embodiment.

FIG. 8 is a block diagram illustrating an internal configuration of an electrically powered vehicle of a second embodiment. FIG. 9 is an electrical circuit including a high-capacity battery, a high-power battery, a VCU, a PDU, and a motor/generator of the second embodiment. The electrically powered vehicle of the second embodiment differs from the electrically powered vehicle of the first embodiment in the point that a VCU 203 is provided to transform the voltage of the high-capacity battery ES-E. Configuration is similar to that of the first embodiment except for in this point, and the configuration elements illustrated in FIG. 8 and FIG. 9 are allocated reference numerals the same as or equivalent to those of the same or equivalent elements in the first embodiment, and explanation thereof is simplified or omitted.

The VCU 203 steps up the output voltage of the high-capacity battery ES-E without converting from direct current. The VCU 203 steps down power that has been generated by the motor/generator 101 during deceleration of the electrically powered vehicle and converted into direct current. The VCU 203 also steps down the output voltage of the VCU 103 without converting from direct current. The power stepped down by the VCU 203 is used to charge the high-capacity battery ES-E. As illustrated in FIG. 9, the VCU 203 employs an output voltage of the high-capacity battery ES-E as an input voltage, and steps up and outputs the voltage of the high-capacity battery ES-E by switching two switching elements ON and OFF.

An ECU 1152 controls the PDU 105 and the VCUs 103 and 203, and also controls opening and closing of the switch section 113. The ECU 1152 also manages the system permitted power, similarly to the ECU 115 of the first embodiment. The ECU 1152 also employs the VCUs 103 and 203 to perform power distribution control. The ECU 1152 detects faults, and prior indicators of faults, in the high-power battery ES-P and the high-capacity battery ES-E respectively based on the voltages detected by the voltage sensors 107$p$ and 107$e$, the currents detected by the current sensors 109$p$ and 109$e$, and the temperatures detected by the temperature sensors 111$p$ and 111$e$.

The ECU 1152 controls the VCUs 103 and 203 in the "current control mode" when a fault has occurred in neither the high-power battery ES-P nor the high-capacity battery ES-E. When a fault has occurred in either the high-power battery ES-P or the high-capacity battery ES-E, the ECU 1152 uses the "voltage control mode" to control the VCU that steps up the correctly functioning battery. Explanation follows regarding the two control modes (the current control mode and the voltage control mode) with which the ECU 1152 controls the VCUs 103 and 203.

The current control mode is, in principle, employed in a state in which both the high-capacity battery ES-E and the high-power battery ES-P are functioning correctly. In the current control mode, the voltage Ve output by the high-capacity battery ES-E is stepped up to a voltage V by the VCU 203 and applied to the motor/generator 101 by the power distribution control of the VCUs 103 and 203. In cases in which the power supplied from the high-capacity battery ES-E does not meet the power demand corresponding to the power demanded by the motor/generator 101, the VCU 103 is controlled using feed-back control or feed-forward control such that the high-power battery ES-P outputs power to make up the insufficiency amount. The VCU 103 steps up the voltage Vp of the high-power battery ES-P to a voltage equal to the output voltage V of the VCU 203. In this manner, in the current control mode, the voltage Vp of the high-power battery ES-P is stepped up to a voltage equal to the output voltage V of the VCU 203, and the current Ip output by the high-power battery ES-P differs according to the size of the power insufficiency amount demanded of the high-power battery ES-P. Accordingly, in the current control mode, the voltage Vp and the current Ip of the high-power battery ES-P are fed back to the VCU 103. Note that control is stable when performing control in the current control mode.

The voltage control mode is employed in a state in which, out of the high-capacity battery ES-E and the high-power battery ES-P, one of the batteries is functioning correctly, and a fault has occurred in the other battery. In the voltage control mode, power is only supplied to the motor/generator 101 from the non-faulty battery. Moreover, the VCU for stepping up the voltage of the non-faulty battery steps up the voltage of the non-faulty battery such that the voltage applied to the motor/generator 101 is an optimum voltage at which the drive efficiency for the drive power demanded by the motor/generator 101 is a threshold value or greater. Accordingly, in the voltage control mode, either feed-forward control to set an instruction value to the optimum voltage of the motor/generator 101, or feed-back control to set an instruction value to the difference between the voltage of the non-faulty battery and the optimum voltage of the motor/generator 101, is employed to control the VCU that steps up the voltage of the non-faulty battery. This thereby enables the drive efficiency of the motor/generator 101 to be optimized.

Similarly to in the first embodiment, in the present embodiment, when a prior indicator of a fault in either battery occurs while the ECU 1152 is controlling the VCUs 103 and 203 in the current control mode due to both the high-capacity battery ES-E and the high-power battery ES-P functioning correctly, the ECU 1152 controls the VCUs 103 and 203 so as to supply power from the battery in which the prior indicator has occurred to the other battery. Then, if a fault occurs in the one battery, the ECU 1152 raises a fault flag indicating a fault in that battery. The ECU 1152 then opens the contactor on the side of the faulty battery, and gradually lowers the setting value of the system permitted power to the outputtable power of the correctly functioning battery. The ECU 1152 switches the control mode of the VCU that steps up the correctly functioning battery from the current control mode to the voltage control mode after lowering the setting value of the system permitted power to the outputtable power of the correctly functioning battery. The ECU 1152 then controls that VCU in the voltage control mode.

Accordingly, in the present embodiment, when a fault has occurred in one of the batteries, the power output of the correctly functioning battery can be suppressed to an appropriate value without becoming too large, thereby enabling power of the correctly functioning battery to be employed appropriately. Moreover, although excessive power output would promote battery deterioration, the power output of the correctly functioning battery can be suppressed to an appropriate value without becoming too large, thereby enabling promotion of deterioration of the correctly functioning battery to be prevented.

The present disclosure is not limited by the embodiments described above, and modifications and improvements may be made as appropriate. For example, the electrically powered vehicle described above is a single motor electrical vehicle (EV). However, the electrically powered vehicle may be an EV installed with plural motor/generators, may be a hybrid electrical vehicle (HEV) or a plug-in hybrid electrical vehicle (PHEV) installed with at least one motor/generator and an internal combustion engine, or may be a fuel cell vehicle (FCV).

A first aspect of the present disclosure describes a drive system including: a first energy storage (for example, a high-power battery ES-P of an embodiment, described later); a second energy storage (for example, a high-capacity battery ES-E of an embodiment, described later) having a different voltage to the first energy storage; a voltage transformation section (for example, a VCU 103, 203 of an embodiment, described later) that transforms at least one of an output voltage of the first energy storage and an output voltage of the second energy storage; a drive section (for example, a PDU 105 and a motor generator 101 of an embodiment, described later) that is driven by power supplied from at least one of the first energy storage and the second energy storage; a detection section (for example an ECU 115 of an embodiment, described later) that detects faults in the first energy storage and the second energy storage; and a controller (for example the ECU 115 of an embodiment, described later). The controller controls the voltage transformation section based on either a first control mode (for example a current control mode of an embodiment, described later) in which control is performed such that, according to a difference between a target power and a power supplied to the drive section from one of the first energy storage and the second energy storage, the voltage transformation section transforms an output voltage of the other of the first energy storage and the second energy storage, or a second control mode (for example a voltage control mode of an embodiment, described later) in which control is performed such that, according to an output voltage of one of the first energy storage and the second energy storage and to a target voltage to be applied to the drive section, the voltage transformation section transforms the output voltage of the one of the first energy storage and the second energy storage. When the detection section has not detected a fault in the first energy storage and has not detected a fault in the second energy storage, the controller sets a power suppliable to the drive section to the sum of powers outputtable by the first energy storage and the second energy storage and controls the voltage transformation section in the first control mode. When the detection section has detected a fault in either the first energy storage or the second energy storage, the controller sets the suppliable power to the drive section to the outputtable power of the non-faulty energy storage and then switches from the first control mode to the second control mode, and controls the voltage transformation section in the second control mode to transform the output voltage of the non-faulty energy storage.

In a second aspect of the present disclosure, the first aspect may further include a switch section (for example a switch section 113 of an embodiment, described later) that opens or closes current paths between the drive section and the first energy storage or the second energy storage. Configuration may be made in which, when the detection section has detected a fault in either the first energy storage or the second energy storage, the controller controls the switch section to open the current path between the faulty energy storage and the drive section, and then switches from the first control mode to the second control mode.

In a third aspect of the present disclosure, in the second aspect, configuration may be made in which, when the detection section has detected a fault in either the first energy storage or the second energy storage, the controller controls the switch section to open the current path between the faulty energy storage and the drive section, then sets the suppliable power to the drive section to the outputtable power of the non-faulty energy storage, and then switches from the first control mode to the second control mode.

In a fourth aspect of the present disclosure, in the first aspect to the third aspect, configuration may be made in which, when the controller sets the suppliable power to the drive section to the outputtable power of the non-faulty energy storage, the controller gradually changes the suppliable power to the drive section from the sum of the outputtable powers of the first energy storage and the second energy storage to the outputtable power of the non-faulty energy storage.

In a fifth aspect of the present disclosure, in the first aspect to the fourth aspect, configuration may be made in which the detection section detects a prior indicator of a fault in either the first energy storage or the second energy storage, and, when the detection section has detected a prior indicator of a fault in either the first energy storage or the second energy storage, the controller controls the voltage transformation section so as to supply power from the energy storage for which a prior indicator has been detected to the other energy storage.

In a sixth aspect of the present disclosure, in the first aspect to the fifth aspect, configuration may be made in which the target voltage is an optimum voltage at which drive efficiency for the output demanded by the drive section is a threshold value or greater.

In a seventh aspect of the present disclosure, in the first aspect to the sixth aspect, configuration may be made in which: the voltage transformation section transforms the output voltage of the first energy storage; the detection section detects faults in the second energy storage; in the first control mode, the voltage transformation section is controlled according to the difference between the power supplied to the drive section from the second energy storage and a target power; and in the second control mode, the voltage transformation section is controlled according to the output voltage of the first energy storage and a target voltage to be applied to the drive section. When the detection section has detected a fault in the second energy storage, the controller sets the suppliable power to the drive section to the outputtable power of the first energy storage, and then switches from the first control mode to the second control mode, and controls the voltage transformation section in the second control mode.

In an eighth aspect of the present disclosure, in the first aspect to the sixth aspect, configuration may be made in which the voltage transformation section includes a first voltage transformation section (for example a VCU 103 of an embodiment, described later) that transforms the output voltage of the first energy storage, and a second voltage transformation section (for example a VCU 203 of an embodiment, described later) that transforms the output voltage of the second energy storage.

A ninth aspect of the present disclosure describes a transporter including the drive system of any one of the first aspect to the eighth aspect.

A tenth aspect of the present disclosure describes a control method performed by a drive system including: a first energy storage (for example, the high-power battery ES-P of an embodiment, described later); a second energy storage (for example, the high-capacity battery ES-E of an embodiment, described later) having a different voltage to the first energy storage; a voltage transformation section (for example, the VCU 103, 203 of an embodiment, described later) that transforms at least one of an output voltage of the first energy storage and an output voltage of the second energy storage; a drive section (for example, the PDU 105 and the motor generator 101 of an embodiment, described later) that is driven by power supplied from at least one of the first energy storage and the second energy storage; a detection section (for example the ECU 115 of an embodiment, described later) that detects faults in the first energy storage and the second energy storage; and a controller (for example the ECU 115 of an embodiment, described later) that controls the voltage transformation section based on either a first control mode (for example the current control mode of an embodiment, described later) in which control is performed such that, according to a difference between a target power and a power supplied to the drive section from one of the first energy storage and the second energy storage, the voltage transformation section transforms an output voltage of the other of the first energy storage and the second energy storage, or a second control mode (for example the voltage control mode of an embodiment, described later) in which control is performed such that, according to an output voltage of one of the first energy storage and the second energy storage and to a target voltage to be applied to the drive section, the voltage transformation section transforms the output voltage of the one of the first energy storage and the second energy storage. The control method includes: when the detection section has not detected a fault in the first energy storage and has not detected a fault in the second energy storage, setting a power suppliable to the drive section to the sum of powers outputtable by the first energy storage and the second energy storage and controlling the voltage transformation section in the first control mode; and when the detection section has detected a fault in either the first energy storage or the second energy storage, setting the suppliable power to the drive section to the outputtable power of the non-faulty energy storage and then switching from the first control mode to the second control mode, and controlling the voltage transformation section in the second control mode to transform the output voltage of the non-faulty energy storage.

When both the first energy storage and the second energy storage are functioning correctly, the voltage transformation section is controlled so as to supply power to the drive section in consideration of the properties of the respective energy storages. This control is referred to as "power distribution control". In order to supply power to the drive section from both the first energy storage and the second energy storage at the same time, it is necessary to make their voltages equal to one another. Accordingly, in order to perform the power distribution control when both the first energy storage and the second energy storage are functioning correctly, it is necessary to control the voltage transformation section in the first control mode that is capable of controlling the supply voltage.

However, when a fault has occurred in either the first energy storage or the second energy storage, power can only be supplied to the drive section from one of the energy storages, and so the power distribution control cannot be achieved. Accordingly, unlike in the first control mode, it is necessary to control the voltage transformation section in the second control mode that is capable of operating the drive section with high efficiency.

Note that when a fault has occurred in either the first energy storage or the second energy storage, if the second control mode were to be switched to while the suppliable power to the drive section were still set as the sum of the outputtable power of the first energy storage and the second energy storage, then the voltage transformation section and the drive section would draw the power that should really be output from the two energy storages from the correctly functioning energy storage. This would give rise to the possibility of the power output from the correctly functioning energy storage becoming too large. This is not desirable, since it could result in becoming unable to appropriately employ, or could promote deterioration of, the correctly functioning energy storage.

However, in the first aspect, the ninth aspect, and the tenth aspect of the present disclosure, when a fault has occurred in either the first energy storage or the second energy storage, the first control mode is continued until the suppliable power to the drive section has been set to the outputtable power of the correctly functioning energy storage. The second control mode is switched to after this setting has been performed. Accordingly, the power output of the correctly functioning energy storage can be suppressed to no greater than the set suppliable power to the drive section, namely, can be suppressed to no greater than the outputtable power of the correctly functioning energy storage, even when the voltage transformation section transforms the output voltage of the correctly functioning energy storage to the target voltage based on the second control mode. In this manner, according to the first aspect of the present disclosure, the power output of the correctly functioning energy storage can be suppressed to an appropriate value without becoming too large when a fault occurs in the energy storage in comparison to cases in which the second control mode is switched to prior to setting the suppliable power to the drive section to the outputtable power of the correctly functioning energy storage. This thereby enables the power of the correctly functioning energy storage to be employed appropriately. Moreover, although excessive power output would promote deterioration of the energy storages, according to the first aspect of the present disclosure, the power output of the correctly functioning energy storage can be suppressed to an appropriate value without becoming too large, thereby enabling promotion of deterioration of the correctly functioning energy storage to be prevented.

According to the second aspect of the present disclosure, when a fault has occurred in either the first energy storage or the second energy storage, the current path between the faulty energy storage and the drive section is opened before switching from the first control mode to the second control mode. This thereby enables an inflow of power to the faulty energy storage or an outflow of power from the faulty energy storage accompanying the mode change from the first control mode to the second control mode to be prevented.

According to the third aspect of the present disclosure, processing is performed in sequence such that the current path between the faulty energy storage and the drive section is opened, then the setting for the suppliable power to the drive section is changed, and then the first control mode is switched to the second control mode. This thereby enables appropriate employment, and suppression of deterioration, of the correctly functioning energy storage to be performed reliably.

According to the fourth aspect of the present disclosure, the suppliable power to the drive section is gradually changed from the sum of the outputtable powers of the first energy storage and the second energy storage to the outputtable power of the correctly functioning energy storage. This thereby enables the timing of the switch from the first control mode to the second control mode to be delayed.

According to the fifth aspect of the present disclosure, power is transferred to the correctly functioning energy storage when a prior indicator of a fault has occurred. This thereby enables the amount power that can be utilized if a fault actually occurs to be maximized in advance.

According to the sixth aspect of the present disclosure, the drive efficiency of the drive section can be optimized after a fault has occurred in the first energy storage or the second energy storage.

According to the seventh aspect of the present disclosure, even when the voltage transformation section is employed to transform the output voltage of one energy storage, the power of the correctly functioning energy storage can be employed appropriately when a fault has occurred in the other energy storage.

According to the eighth aspect of the present disclosure, even when the voltage transformation section has a configuration including the two sections of a section that transforms the output voltage of one energy storage and a section that transforms the output voltage of the other energy storage, power of the other, correctly functioning, energy storage can be consumed efficiently when a fault occurs in the one energy storage.

Obviously, numerous modifications and variations of the present invention are possible in light of the above teachings. It is therefore to be understood that within the scope of the appended claims, the invention may be practiced otherwise than as specifically described herein.

What is claimed is:

1. A drive system comprising:
   a first energy storage;
   a second energy storage having a different voltage to the first energy storage;
   a voltage transformation section that transforms at least one of an output voltage of the first energy storage and an output voltage of the second energy storage;
   a drive section that is driven by power supplied from at least one of the first energy storage and the second energy storage;
   a detection section that detects faults in the first energy storage and the second energy storage; and
   a controller that controls the voltage transformation section based on either a first control mode in which control is performed such that, according to a difference between a target power and a power supplied to the drive section from one of the first energy storage and the second energy storage, the voltage transformation section transforms an output voltage of the other of the first energy storage and the second energy storage, or a second control mode in which control is performed such that, according to an output voltage of one of the first energy storage and the second energy storage and to a target voltage to be applied to the drive section, the voltage transformation section transforms the output voltage of the one of the first energy storage and the second energy storage; wherein,
   when the detection section has not detected a fault in the first energy storage and has not detected a fault in the second energy storage, the controller sets a power suppliable to the drive section to the sum of powers outputtable by the first energy storage and the second energy storage and controls the voltage transformation section in the first control mode, and,
   when the detection section has detected a fault in either the first energy storage or the second energy storage, the controller sets the suppliable power to the drive section to the outputtable power of the non-faulty energy storage and then switches from the first control mode to the second control mode, and controls the voltage transformation section in the second control mode to transform the output voltage of the non-faulty energy storage.

2. The drive system of claim 1, further comprising:
   a switch section that opens or closes current paths between the drive section and the first energy storage or the second energy storage; wherein,
   when the detection section has detected a fault in either the first energy storage or the second energy storage, the controller controls the switch section to open the current path between the faulty energy storage and the drive section, and then switches from the first control mode to the second control mode.

3. The drive system of claim 2, wherein, when the detection section has detected a fault in either the first energy storage or the second energy storage, the controller controls the switch section to open the current path between the faulty energy storage and the drive section, then sets the suppliable power to the drive section to the outputtable power of the non-faulty energy storage, and then switches from the first control mode to the second control mode.

4. The drive system of claim 1, wherein, when the controller sets the suppliable power to the drive section to the outputtable power of the non-faulty energy storage, the controller gradually changes the suppliable power to the drive section from the sum of the outputtable powers of the first energy storage and the second energy storage to the outputtable power of the non-faulty energy storage.

5. The drive system of claim 1, wherein:
the detection section detects a prior indicator of a fault in either the first energy storage or the second energy storage; and,
when the detection section has detected a prior indicator of a fault in either the first energy storage or the second energy storage, the controller controls the voltage transformation section so as to supply power from the energy storage for which a prior indicator has been detected to the other energy storage.

6. The drive system of claim 1, wherein the target voltage is an optimum voltage at which drive efficiency for the output demanded by the drive section is a threshold value or greater.

7. The drive system of claim 1, wherein:
the voltage transformation section transforms the output voltage of the first energy storage;
the detection section detects faults in the second energy storage;
in the first control mode, the voltage transformation section is controlled according to the difference between the power supplied to the drive section from the second energy storage and a target power;
in the second control mode, the voltage transformation section is controlled according to the output voltage of the first energy storage and a target voltage to be applied to the drive section; and
when the detection section has detected a fault in the second energy storage, the controller sets the suppliable power to the drive section to the outputtable power of the first energy storage, and then switches from the first control mode to the second control mode, and controls the voltage transformation section in the second control mode.

8. The drive system of claim 1, wherein the voltage transformation section includes a first voltage transformation section that transforms the output voltage of the first energy storage, and a second voltage transformation section that transforms the output voltage of the second energy storage.

9. A transporter including the drive system of claim 1.

10. A control method performed by a drive system including
a first energy storage,
a second energy storage having a different voltage to the first energy storage,
a voltage transformation section that transforms at least one of an output voltage of the first energy storage and an output voltage of the second energy storage,
a drive section that is driven by power supplied from at least one of the first energy storage and the second energy storage,
a detection section that detects faults in the first energy storage and the second energy storage, and
a controller that controls the voltage transformation section based on either a first control mode in which control is performed such that, according to a difference between a target power and a power supplied to the drive section from one of the first energy storage and the second energy storage, the voltage transformation section transforms an output voltage of the other of the first energy storage and the second energy storage, or a second control mode in which control is performed such that, according to an output voltage of one of the first energy storage and the second energy storage and to a target voltage to be applied to the drive section, the voltage transformation section transforms the output voltage of the one of the first energy storage and the second energy storage;
the control method comprising:
when the detection section has not detected a fault in the first energy storage and has not detected a fault in the second energy storage, setting a power suppliable to the drive section to the sum of powers outputtable by the first energy storage and the second energy storage and controlling the voltage transformation section in the first control mode; and
when the detection section has detected a fault in either the first energy storage or the second energy storage, setting the suppliable power to the drive section to the outputtable power of the non-faulty energy storage and then switching from the first control mode to the second control mode, and controlling the voltage transformation section in the second control mode to transform the output voltage of the non-faulty energy storage.

11. A drive system comprising:
a first energy storage to output a first voltage;
a second energy storage to output a second voltage different from the first voltage;
a voltage transformer to transform at least one of the first voltage and the second voltage;
a drive apparatus to be driven with power supplied from at least one of the first energy storage and the second energy storage;
a detector to detect a fault in at least one of the first energy storage and the second energy storage; and
circuitry configured to
control the voltage transformer in a first control mode and determine a power suppliable to the drive apparatus to be a sum of a first power suppliable by the first energy storage and a second power suppliable by the second energy storage in a case where the detector does not detect the fault in the first energy storage and the fault in the second energy storage, the voltage transformer being controlled, in the first control mode, to transform a voltage output by one of the first energy storage and the second energy storage according to a difference between a target power and a power supplied to the drive apparatus from another of the first energy storage and the second energy storage, and
control the voltage transformer in a second control mode to transform an output voltage supplied by a non-faulty energy storage among the first energy storage and the second energy storage after determining the power suppliable to the drive apparatus to be a power suppliable by the non-faulty energy storage in a case where the detector detects the fault in either the first energy storage or the second energy storage, the voltage transformer being controlled, in the second control mode, to transform one of the first voltage and the second voltage according to a target voltage to be applied to the drive apparatus and the one of the first voltage and the second voltage.

12. The drive system of claim 11, further comprising:
a switch section that opens or closes current paths between the drive apparatus and the first energy storage or the second energy storage; wherein,
when the detector has detected a fault in either the first energy storage or the second energy storage, the controller controls the switch section to open the current path between the faulty energy storage and the drive apparatus, and then switches from the first control mode to the second control mode.

13. The drive system of claim 12, wherein, when the detector has detected a fault in either the first energy storage or the second energy storage, the controller controls the switch section to open the current path between the faulty energy storage and the drive apparatus, then sets the suppliable power to the drive apparatus to the outputtable power of the non-faulty energy storage, and then switches from the first control mode to the second control mode.

14. The drive system of claim 11, wherein, when the controller sets the suppliable power to the drive apparatus to the outputtable power of the non-faulty energy storage, the controller gradually changes the suppliable power to the drive apparatus from the sum of the outputtable powers of the first energy storage and the second energy storage to the outputtable power of the non-faulty energy storage.

15. The drive system of claim 11, wherein:
the detector detects a prior indicator of a fault in either the first energy storage or the second energy storage; and,
when the detector has detected a prior indicator of a fault in either the first energy storage or the second energy storage, the controller controls the voltage transformer so as to supply power from the energy storage for which a prior indicator has been detected to the other energy storage.

16. The drive system of claim 11, wherein the target voltage is an optimum voltage at which drive efficiency for the output demanded by the drive apparatus is a threshold value or greater.

17. The drive system of claim 11, wherein:
the voltage transformer transforms the output voltage of the first energy storage;
the detector detects faults in the second energy storage;
in the first control mode, the voltage transformer is controlled according to the difference between the power supplied to the drive apparatus from the second energy storage and a target power;
in the second control mode, the voltage transformer is controlled according to the output voltage of the first energy storage and a target voltage to be applied to the drive apparatus; and
when the detector has detected a fault in the second energy storage, the controller sets the suppliable power to the drive apparatus to the outputtable power of the first energy storage, and then switches from the first control mode to the second control mode, and controls the voltage transformer in the second control mode.

18. The drive system of claim 11, wherein the voltage transformer includes a first voltage transformation section that transforms the output voltage of the first energy storage, and a second voltage transformation section that transforms the output voltage of the second energy storage.

19. A transporter including the drive system of claim 11.

20. A control method performed by a drive system, comprising:
controlling a voltage transformer in a first control mode and determining a power suppliable to a drive apparatus to be a sum of a first power suppliable by a first energy storage and a second power suppliable by a second energy storage in a case where a detector does not detect a fault in the first energy storage and a fault in the second energy storage, the voltage transformer being controlled, in the first control mode, to transform a voltage output by one of the first energy storage and the second energy storage according to a difference between a target power and a power supplied to the drive apparatus from another of the first energy storage and the second energy storage, and
controlling the voltage transformer in a second control mode to transform an output voltage supplied by a non-faulty energy storage among the first energy storage and the second energy storage after determining the power suppliable to the drive apparatus to be a power suppliable by the non-faulty energy storage in a case where the detector detects the fault in either the first energy storage or the second energy storage, the voltage transformer being controlled, in the second control mode, to transform one of the first voltage and the second voltage according to a target voltage to be applied to the drive apparatus and the one of the first voltage and the second voltage.

* * * * *